United States Patent
Salter et al.

(10) Patent No.: US 11,486,480 B1
(45) Date of Patent: Nov. 1, 2022

(54) CONTROL OF ELECTRONIC LOCKING DIFFERENTIAL

(71) Applicant: Ford Global Technologies, LLC, Dearborn, MI (US)

(72) Inventors: Stuart C. Salter, White Lake, MI (US); Brian James Andonian, Plymouth, MI (US); Gustavo Luis Garcia, Jackson, MI (US); Jihong Guo, Ann Arbor, MI (US); Andrew Monticello, Farmington Hills, MI (US); Joseph Daniel, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/331,867

(22) Filed: May 27, 2021

(51) Int. Cl.
| *F16H 48/34* | (2012.01) |
| *F16H 48/20* | (2012.01) |
| *F16D 48/06* | (2006.01) |
| *F16D 27/00* | (2006.01) |

(52) U.S. Cl.
CPC ........... *F16H 48/34* (2013.01); *F16D 48/064* (2013.01); *F16D 2027/002* (2013.01); *F16H 2048/204* (2013.01); *F16H 2048/346* (2013.01)

(58) Field of Classification Search
CPC ............................... F16D 48/06; F16D 48/064
See application file for complete search history.

(56) References Cited

U.S. PATENT DOCUMENTS

| 7,399,248 | B2 | 7/2008 | Kleinhans et al. |
| 7,425,185 | B2 | 9/2008 | Donofrio et al. |
| 7,791,216 | B2 * | 9/2010 | Xu ........................ B60W 10/26 |
| | | | 307/9.1 |
| 8,109,853 | B2 | 2/2012 | Povirk et al. |
| 8,190,350 | B2 * | 5/2012 | Kortschak ........... F02N 11/0866 |
| | | | 701/113 |
| 9,605,740 | B2 | 3/2017 | Povirk et al. |
| 9,726,240 | B2 * | 8/2017 | David ................... F16D 48/064 |
| 10,724,622 | B2 | 7/2020 | Vuksa |
| 10,748,717 | B2 * | 8/2020 | Bondavalli ............ H01G 11/42 |
| 2019/0136952 | A1 | 5/2019 | Garcia et al. |
| 2019/0337401 | A1 * | 11/2019 | Springer ................. B60L 58/16 |

FOREIGN PATENT DOCUMENTS

| CN | 102042381 A | 5/2011 |
| EP | 1580458 B1 | 7/2012 |
| WO | 2014-116802 A1 | 7/2014 |
| WO | 2016-023083 A1 | 2/2016 |

* cited by examiner

*Primary Examiner* — Ernesto A Suarez
*Assistant Examiner* — James J Taylor, II
(74) *Attorney, Agent, or Firm* — Vincent Mastrogiacomo; Brooks Kushman P.C.

(57) ABSTRACT

An electronic locking differential includes a lock ring and a coil that moves the lock ring to engage gears of the electronic locking differential, an energy storage capacitor that powers the coil during at least a portion of engagement of the lock ring with the gears, and a controller. The controller charges the energy storage capacitor to a first predefined voltage prior to the engagement.

18 Claims, 3 Drawing Sheets

CONTROL OF ELECTRONIC LOCKING DIFFERENTIAL

TECHNICAL FIELD

This disclosure relates to automotive drivelines and the control of components related thereto.

BACKGROUND

Some locking differentials are designed to lock both wheels on an axle. This causes both wheels to turn together, regardless of traction available to either wheel individually. When unlocked, each wheel may rotate at different speeds. An unlocked differential provides the same torque to each wheel on that axle. Because a locked differential causes both wheels on the same axle to rotate at the same speed, each wheel can apply as much rotational force as the surface under it will allow. A locked differential may thus provide advantages over an unlocked differential under certain circumstances.

SUMMARY

A driveline system includes an auxiliary battery, an electronic locking differential including a lock ring and a coil that moves the lock ring to engage gears of the electronic locking differential, and an energy storage capacitor that powers the coil during at least a portion of engagement of the lock ring with the gears. The driveline system also includes a controller that charges the energy storage capacitor to a first predefined voltage prior to the engagement, and responsive to discharge of the energy storage capacitor to a second predefined value, continues powering the coil with energy from the auxiliary battery.

A method includes electrically connecting an energy storage capacitor to a coil to power the coil and cause a lock ring of an electronic locking differential to engage gears of the electronic locking differential. The method also includes, responsive to discharge of the energy storage capacitor to a predefined value, electrically connecting an auxiliary battery to the coil to power the coil and maintain engagement of the lock ring with the gears.

A driveline system includes an electronic locking differential including a lock ring and a coil that moves the lock ring to engage gears of the electronic locking differential, an energy storage capacitor that powers the coil during at least a portion of engagement of the lock ring with the gears, and a boost circuit that charges the energy storage capacitor. The driveline system also includes a controller that reduces an output voltage of the boost circuit responsive to data indicating the lock ring has engaged the gears or upon expiration of a predefined time period.

DETAILED DESCRIPTION

Figure 1:
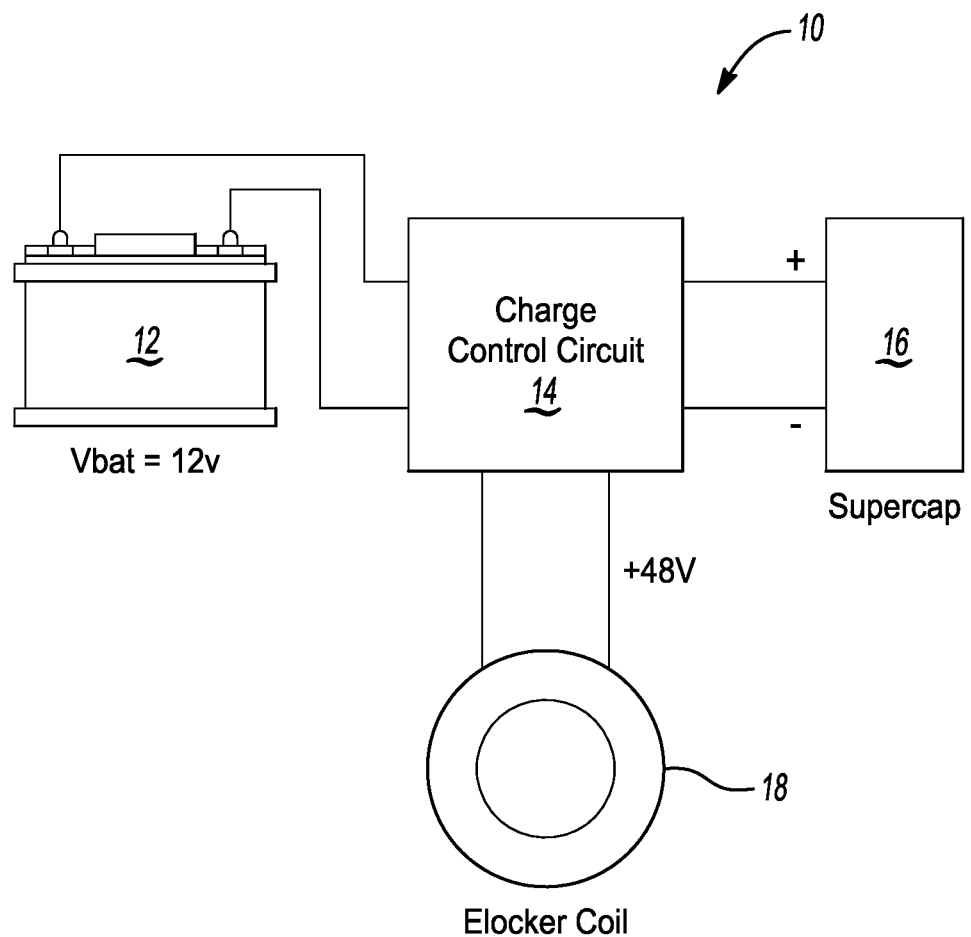
FIG. 1 is a schematic diagram of a locking differential system.

Detailed embodiments are disclosed herein. It, however, is to be understood that the disclosed embodiments are merely examples that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Electrically locking differentials often utilize a solenoid that is typically engaged manually by a button or automatically under various circumstances. Traditionally, a twelve-volt solenoid is used to overcome a mechanical spring to lock the differential. A twelve-volt solenoid is common given existing power supplies in vehicles and electronics, and there would be a cost associated with changing this.

In recent years, falling electronics costs have made dedicated DC-DC converters (e.g., boost converters) more economical, especially when incorporated in existing modules. Electronic component cost is expected to continue to fall and is fueling an expansion of electronic features in vehicles.

Within the context of electrically locking differentials, improving spring strength and reducing engagement time may be advantageous. This is usually accomplished with a larger, more expensive coil, even though reducing cost is often an objective during vehicle component development.

This disclosure proposes to use a boost converter circuit to temporarily increase the solenoid voltage up to, for example, forty-eight volts. This boost in voltage can increase force while decreasing reaction time. And at the same time, it will reduce the need to have a larger coil. The opportunity to have a smaller coil means it will also decrease cost.

In one example, a variable voltage boost converter is used to drive a 48V energy storage capacitor (e.g., supercapacitor) that powers the solenoid. The increased voltage allows the coil to be smaller with increased pulling power. Some of the increased pulling power, however, will be offset with a stronger spring to facilitate faster disengagement for antilock braking system events. Increases in spring force will enable quicker disengagement and may be more robust against inadvertent actuation. Disengagement with some amount of torque trapping can also overcome issues with certain dynamic events.

Doubling the voltage may permit use of half the copper wiring relative to previous designs—potentially reducing system cost depending on the cost of any additional electronic components. Added electronics may be integrated with existing module printed circuit boards as an economical way to make use of existing module packaging.

When a switch that connects the boost amplifier/capacitor to the solenoid first closes, the capacitor would be at 48V. This allows it to overcome the increased spring force as well as cold lubrication temperatures. The corresponding boost circuit may, in some examples, be sized to support steady state engagement operation of 24V and 3 A (approximately 72 W) with the increased spring force. Although it could be sized to support 48V and 3 A (approximately 144 W), this is not necessary and may unnecessarily increase cost. The capacitor is thus sized to provide initial pull-in energy over the first 100 milliseconds.

As the capacitor discharges to 24V or less, the boost circuit voltage is reduced to prevent overheating of the solenoid coil and to let the locker disengage even more quickly. Alternatively, boost circuit voltage reduction could depend on whether rear wheel speeds are equal (indicating the lock ring has engaged), or whether some predefined time period (e.g., 300 milliseconds to 400 milliseconds) has passed.

In some arrangements, the boost circuit may be packaged with the bulkhead connector. This may avoid any voltage loss in the wiring, allowing maximum current through the coil. Although there may be costs associated with packaging additional components in this area, it may allow for retrofit solutions.

There may be certain advantages with the proposed designs. Decreases in disengagement time may be possible. The higher pull-in force with 48V, as opposed to 12V, allows for a stronger spring, which may improve torque trapping issues that occur. Block shift changing may be improved due to more tooth offset, which is enabled by the increased solenoid force. Larger wheel deltas when engaging may also be possible.

A decrease in solenoid size may also result in improvements. Costs may be reduced as less copper wiring may be necessary in the system. This may also result in reduced weight and packaging requirements. Differential case performance and/or life may increase as wall thicknesses may be increased, clutch plates may be added, bearing spans may be reduced, etc.

Raising the voltage allows for a stiffer spring even with decreased solenoid size, which may result in several benefits. Disengagement can still be accomplished even with some torque trapping, which will overcome issues in dynamic events. Disengagement may be quicker for anti-lock braking system events. A stiffer spring may be less likely to inadvertently be actuated. After pull-in, booster voltage can be reduced to less than, for example, 12V (a minimum for hold-in), saving power while reducing disengage time.

The embodiments contemplated herein may thus have a smaller, lighter coil with double the pull-in force. This may allow for faster engagement time, and may enable the use of a more powerful return spring, which may be desirable as it reduces the chances of inadvertent engagement.

A lookup table based on rear axle or transmission oil temperature, for example, may be used to determine coil actuation voltage, compensating for coil resistance and oil viscosity. The corresponding control system may detect coil stroke position based on current. This may enable voltage reduction once the coil is fully engaged. The charge control circuit may not allow charging above a certain threshold.

Referring to FIG. 1, an example locking differential actuator 10 includes a battery 12, a charge control circuit 14, a supercapacitor 16, and a coil 18 for an electronic locking differential. The charge control circuit is electrically connected between the battery 12 and supercapacitor 16, and the coil 18. As explained in further detail below, power from the battery 12 is used by the charge control circuit 14 to selectively permit power from the supercapacitor 16 to flow through the coil 18 to actuate the electronic locking differential.

Figure 2:
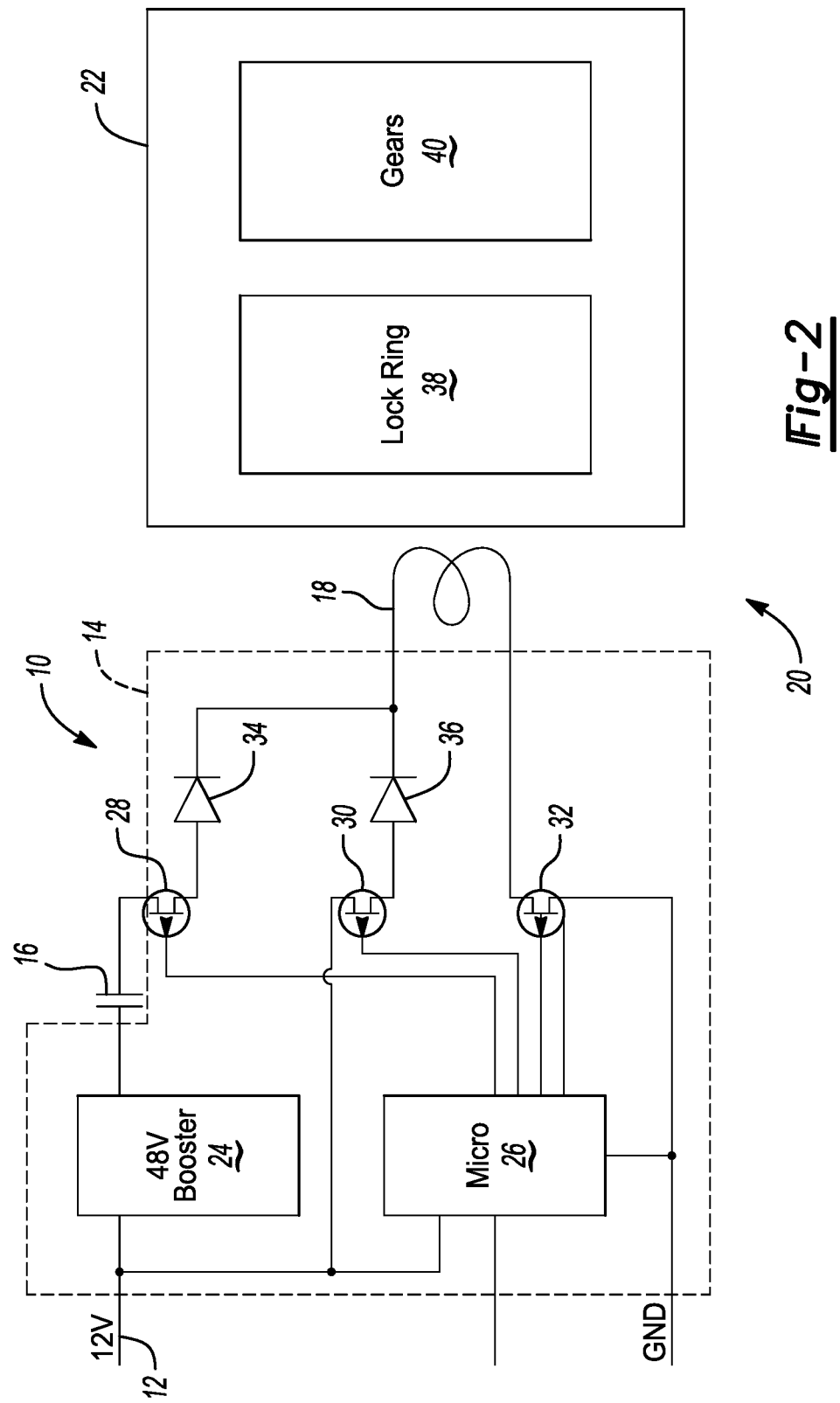
FIG. 2 is a schematic diagram of portions of a driveline.

Referring to FIG. 2, driveline system 20 includes the locking differential actuator 10 and an electronic locking differential 22. The control circuit 14, in this example, includes a 48V boost circuit 24, microcontroller 26, switches 28, 30, 32 (e.g., transistors), and diodes 34, 36. The 48V boost circuit 24 is electrically connected between the battery 12 and supercapacitor 16. As the name suggests, it boosts the voltage input from the battery 12 to 48V to charge the supercapacitor 16. The microcontroller 26 exerts control over the switches 28, 30, 32. Moreover, the switch 28 and diode 34 are in the electrical path between the supercapacitor 16 and coil 18. The switch 30 and diode 36 are in the electrical path between the battery 12 and coil 18. And, the switch 32 is in the electrical path between the coil 18 and ground (GND). The diodes 34, 36 are arranged in their respective electrical paths to prevent current from flowing from the coil 18 back to the switches 28, 30 respectively.

As mentioned above, to charge the supercapacitor 16, the microcontroller 26 commands the switches 28, 30, 32 to open. As such, operation of the 48V boost circuit 24 increases voltage from the battery to 48V. To pass current from the supercapacitor 16 through the coil 18, the microcontroller 26 commands the switches 28, 32 to close (while the switch 30 remains open). This electrically connects the coil 18 between the supercapacitor 16 and ground. To pass current from the battery 12 through the coil 18, the microcontroller 26 commands the switches 30, 32 to close (while the switch 28 remains open). This electrically connects the coil 18 between the battery 12 and ground. To transition the coil 18 from current supplied by the supercapacitor 16 to current supplied by the battery 12, the microcontroller 26 commands the switch 30 to close and the switch 28 to open (while the switch 32 remains closed). As described in more detail below, current flow through the coil 18 may be used to actuate and hold the electronic locking differential 22.

The electronic locking differential 22 includes a lock ring 38 and gears 40. Current flow through the coil 18 causes the lock ring 38 to move and engage the gears 40.

The increased voltage due to use of the supercapacitor 16 allows the coil 18 to be smaller with increased pulling power. Some of this increased pulling power may be off set with a stronger spring as mentioned above to promote faster disengagement for antilock braking system events.

In this example, the 48V boost circuit 24 is sized to support steady state engagement operation of 24V at 3 A of current with the increased spring force, and the supercapacitor 16 is sized to provide initial pull-in energy over the first 100 milliseconds. Other arrangements, however, are also possible.

As the supercapacitor 16 is discharged to 24V (or less), the 48V boost circuit voltage may be reduced under the control of the microcontroller 26 (or other controller) to prevent overheating of the coil 18 and to permit the lock ring 38 to disengage quickly. Alternatively, the 48V boost circuit voltage may be reduced when rear wheel speeds are same (indicating that the lock ring 38 has engaged) or upon expiration of a predefined time period.

Figure 3:
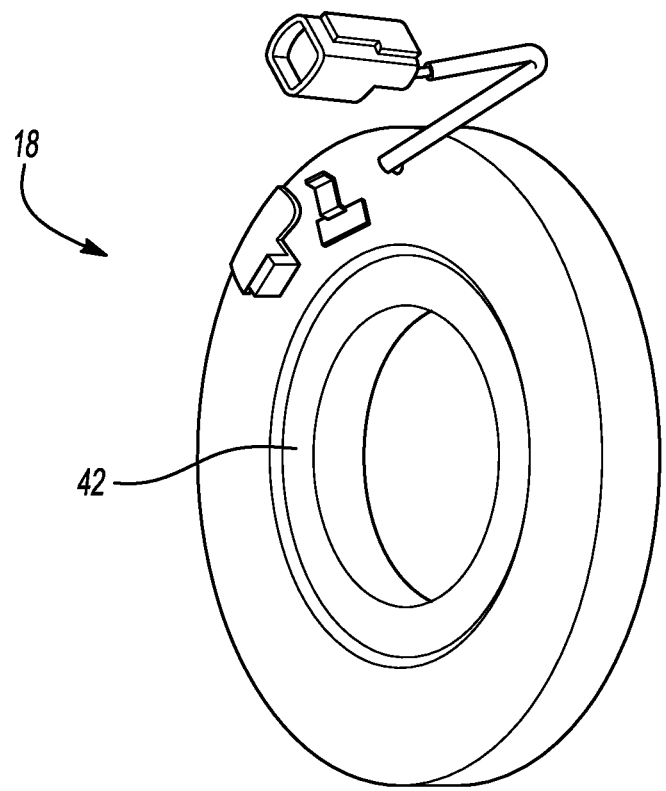
FIG. 3 is a perspective view of the coil of FIGS. 1 and 2.

Typically, a 12V coil has 200 copper windings. Such a coil may also have 2.3Ω resistance, 5.2 A of current at 12V, 1040 A per turn, and a 100N pull-in force. Referring to FIG. 3, the coil 18 is a 48V coil. In this example, the coil 18 has 100 copper windings 42, a 2.3Ω resistance, 20.9 A of current at 48V, 2090 A per turn, and a 200N pull-in force. The coil 18 is thus smaller and lighter than a typical 12V coil with double the pulling force. This allows for faster engagement times and will enable the use of more powerful return springs.

Figure 4:
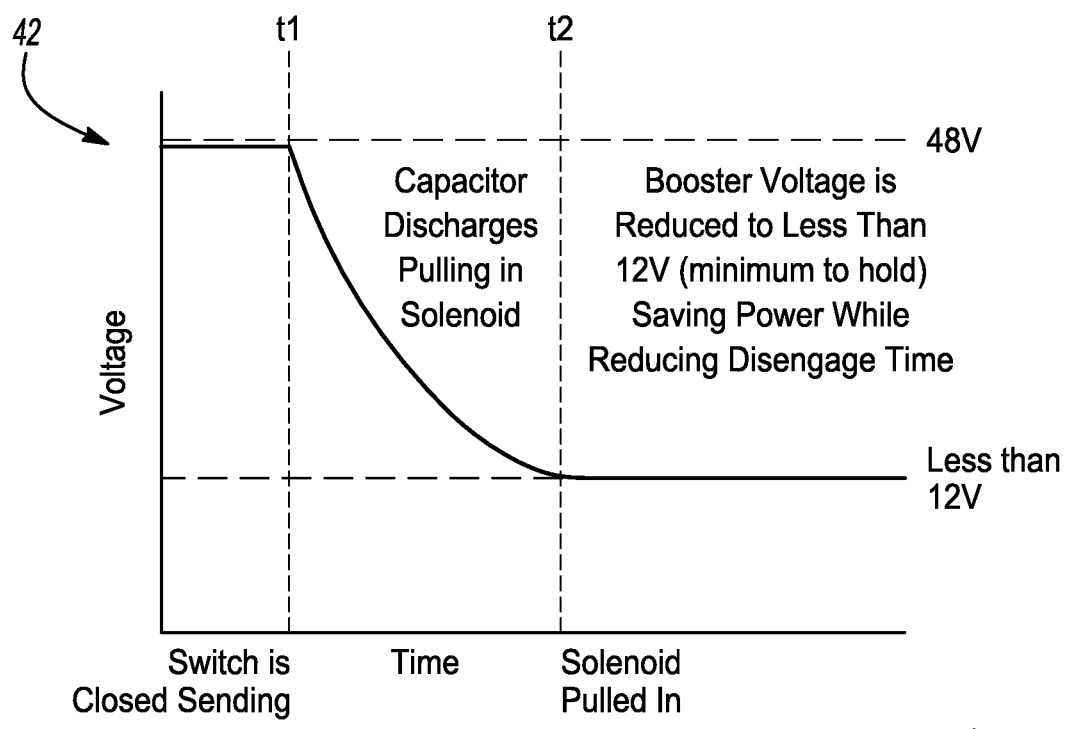
FIG. 4 is a plot of voltage versus time for the supercapacitor of FIGS. 1 and 2.

Referring to FIGS. 2 and 4, prior to closing of the switches 28, 30, 32, the supercapacitor 16 is at 48V. At t1, the switches 28, 32 are closed (while the switch 30 remains open), causing the supercapacitor 16 to discharge through the coil 18. At t2, the output voltage of the 48V boost circuit 24 is reduced to 12V or less to save power and reduce disengagement time.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. Boost circuitry, other than 48V boost circuitry for example, may be used, etc.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A driveline system comprising:
an auxiliary battery;
an electronic locking differential including a lock ring and a coil configured to move the lock ring to engage gears of the electronic locking differential;
an energy storage capacitor configured to power the coil during at least a portion of engagement of the lock ring with the gears; and
a controller programmed to charge the energy storage capacitor to a first predefined voltage prior to the engagement, and responsive to discharge of the energy storage capacitor to a second predefined value, continue powering the coil with energy from the auxiliary battery.

2. The driveline system of claim 1 further comprising a plurality of switches, wherein the controller is further programmed to electrically connect the energy storage capacitor with the coil via activation of at least some of the switches.

3. The driveline system of claim 1 further comprising a plurality of switches, wherein the controller is further programmed to electrically connect the auxiliary battery with the coil via activation of at least some of the switches.

4. The driveline system of claim 1, wherein the energy storage capacitor is a supercapacitor.

5. The driveline system of claim 1, wherein the auxiliary battery is a 12V battery.

6. A method comprising:
electrically connecting an energy storage capacitor to a coil to power the coil and cause a lock ring of an electronic locking differential to engage gears of the electronic locking differential; and
responsive to discharge of the energy storage capacitor to a predefined value, electrically connecting an auxiliary battery to the coil to power the coil and maintain engagement of the lock ring with the gears.

7. The method of claim 6, wherein electrically connecting the energy storage capacitor to the coil includes actuating switches.

8. The method of claim 6 further comprising, responsive to vehicle activation, charging the energy storage capacitor to a second predefined value greater than the predefined value.

9. The method of claim 6, wherein the energy storage capacitor is a supercapacitor.

10. A driveline system comprising:
an electronic locking differential including a lock ring and a coil configured to move the lock ring to engage gears of the electronic locking differential;
an energy storage capacitor configured to power the coil during at least a portion of engagement of the lock ring with the gears;
a boost circuit configured to charge the energy storage capacitor; and
a controller programmed to reduce an output voltage of the boost circuit responsive to data indicating the lock ring has engaged the gears or upon expiration of a predefined time period.

11. The driveline system of claim 10, wherein the data is wheel speed data.

12. The driveline system of claim 10 further comprising a plurality of switches, wherein the controller is further programmed to electrically connect the energy storage capacitor with the coil via activation of at least some of the switches.

13. The driveline system of claim 10, wherein the energy storage capacitor is a supercapacitor.

14. The driveline system of claim 10, wherein the predefined time period is 400 milliseconds or less.

15. The driveline system of claim 10 further comprising an auxiliary battery, wherein the controller is further programmed to electrically connect the auxiliary battery with the coil.

16. The driveline system of claim 15 further comprising a plurality of switches, wherein the controller is further programmed to electrically connect the auxiliary battery with the coil via activation of at least some of the switches.

17. The driveline system of claim 15, wherein the controller is further programmed to electrically connect the auxiliary battery with the coil after reducing the output voltage.

18. The driveline system of claim 15, wherein the auxiliary battery is a 12V battery.

* * * * *